United States Patent

Aguiar

[15] 3,691,452
[45] Sept. 12, 1972

[54] CONTROL OF AC POWER BY A LOGIC COMPARATOR

[72] Inventor: Gabriel A. Aguiar, Riverdale, N.Y. 10013

[73] Assignee: The Western Union Telegraph Company, New York, N.Y.

[22] Filed: May 3, 1971

[21] Appl. No.: 139,690

[52] U.S. Cl. ..........................323/19, 323/24, 323/34
[51] Int. Cl.................................................G05f 3/04
[58] Field of Search....307/133, 252 UA; 323/16, 18, 323/19, 225 C, 24, 34

[56] References Cited

UNITED STATES PATENTS

| | | | |
|---|---|---|---|
| 3,452,214 | 6/1969 | Martin | 323/225 C |
| 3,562,625 | 2/1971 | Broek | 323/24 |
| 3,283,179 | 11/1966 | Carlisle et al. | 307/133 |
| 3,491,283 | 1/1970 | Johnston | 323/24 |
| 3,541,429 | 11/1970 | Martin | 323/16 |

Primary Examiner—A. D. Pellinen
Attorney—Michael I. Borsella

[57] ABSTRACT

Apparatus for controlling the amount of power applied to a given load from a periodic voltage source, such an AC source, indirect response to a digital control signal. The method involves a principle of operation in which the AC source is applied to the load over measured time portions of the successive periods of the source voltage to obtain the desired average power applied to the load. Equal increments of time are measured in each half-wave of the source and a first digital signal is generated corresponding to the time elasped from the zero voltage crossing point. A second digital signal is generated corresponding to a time portion of the source's half-wave over which the source voltage ought to be applied to the load to obtain the desired average power. The source is then switched on and off the load in each half-wave in response to a comparison of the first and second digital signals.

4 Claims, 5 Drawing Figures

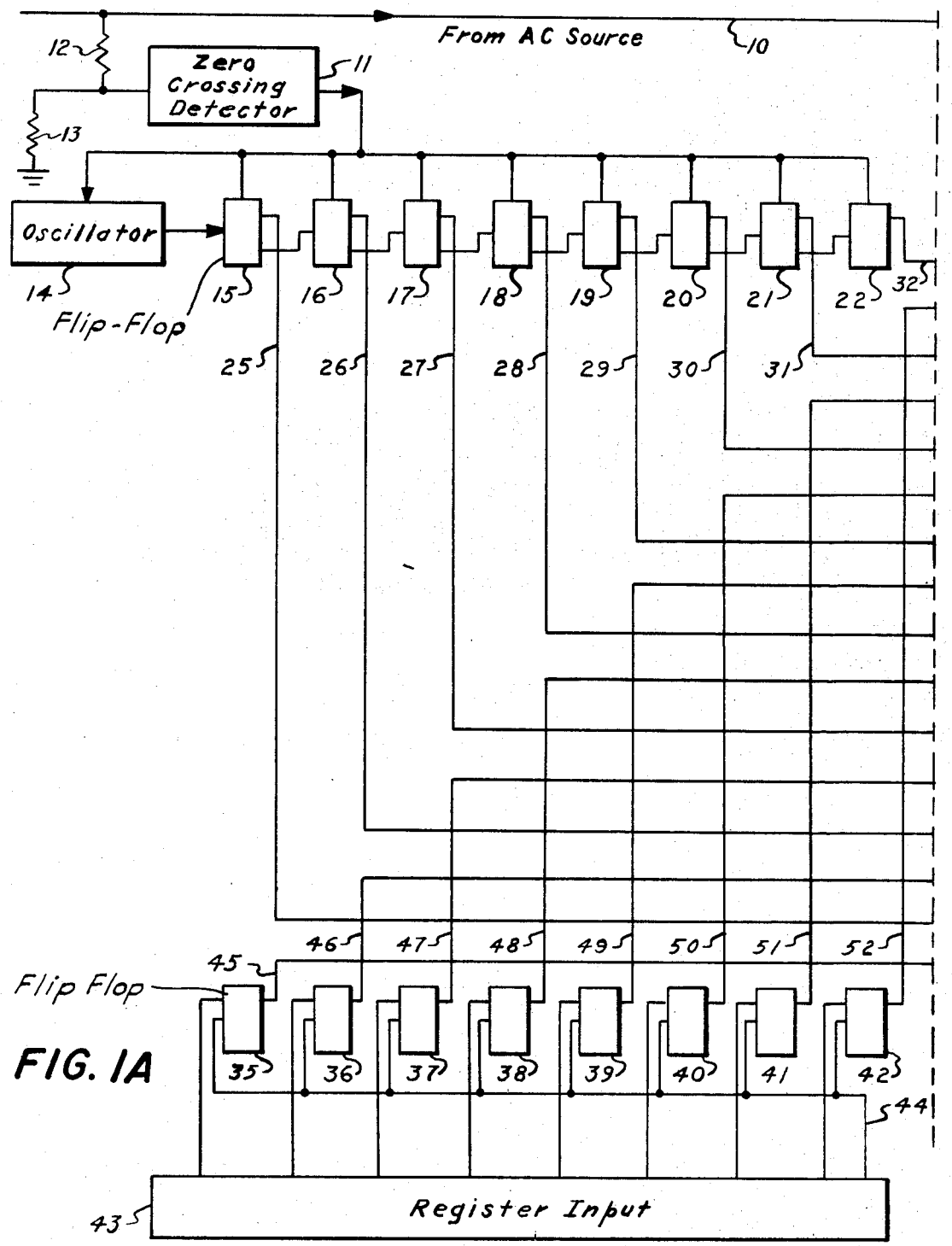
FIG. IA
FIG. IC
INVENTOR:
G. A. AGUIAR
ATTORNEY

CONTROL OF AC POWER BY A LOGIC COMPARATOR

BACKGROUND OF THE INVENTION

This invention pertains to a method and apparatus for electrical power control and more particularly for the control of power directly in response to a digital control signal without the need for digital-to-analog conversion of the signal.

With the increased use of digital control equipment such as is prevalent in computer control of various processes the need has become more acute to provide the capability of controlling the power delivered to a given load in direct response to a digital signal. An example is seen in reference to computer control of a steel rolling mill in which the speed of various rolling elements and steel moving equipment is subject to control by a digital computer for efficient performance of the process. Typically, the speed control signals are firstly available in digital form and in accordance with the prior art are then converted to analog form and applied to appropriate control equipment to vary the power or the voltage applied to the various electric motors used in the process. The conventionally used digital-to-analog converters are significantly complex and costly.

The present invention provides a method and apparatus by which the power applied to a given load can be directly controlled by a digital signal without the use of a digital-to-analog converter. Thus, the invention can be used in connection with a variety of digital equipment where a digital control signal representing the power to be applied to a given load can be conveniently generated.

SUMMARY

The method of the present invention provides a series of steps for the control of power applied to a given load on a time interruption principle amenable to direct control by a digital signal. Thus, one aspect of the present invention resides in a method for applying a predetermined average amount of electrical power, to a load, from a source which provides a voltage periodically variable with time in accordance with a voltage-time characteristic approximately repeated from period to period thereof, including the steps of; applying the voltage to the load at a first point in said period and measuring time to provide for a time interval of power from the voltage to the load during the period, which results in an average power applied to the load over the period substantially equal to the desired average electrical power. The method includes the further step of switching the voltage off the load at a point in said period separated sufficiently in time from the aforementioned first point to provide for the aforementioned time interval of power transmitted to the load.

Another aspect of the invention resides in apparatus for applying a predetermined average amount of electrical power to a given load from a source which provides an AC voltage, comprising in combination; means for generating a time varying first digital signal corresponding to the progression of time during the half-wave interval of the AC voltage from a zero crossing point thereof, and means for entering into the apparatus a second digital signal corresponding to a portion of time from a zero crossing point of the AC voltage which if the AC voltage is applied to the load over that portion of time results in the desired average power applied to the load as an average over the half-wave interval of the AC voltage. The apparatus further includes, comparator means for comparing the first and second digital signals, and switching means responsive to the comparator means for switching the AC voltage on and off the load to provide for the voltage being applied to the load over the aforementioned portion of time.

In view of the foregoing it is an object of the invention to provide a method amenable to digital control for applying an amount of electrical power to a load.

It is another object of the invention to provide a method for applying an amount of electrical power to a load subject to direct control by a digital signal without requiring digital-to-analog conversion steps.

It is yet another object of the present invention to provide a method for controlling the power applied to a load from an AC voltage source which involves controlling a time portion of the half-wave cycle of the voltage over which it is applied to the load.

It is another object of the invention to provide apparatus for controlling the amount of electrical power applied to a given load in response to a digital control signal.

It is yet another object of the invention to provide apparatus including switching elements and means capable of responding to a digital control signal for controlling the power applied to a load by controlling the duration of successive time intervals an AC voltage is applied to the load.

These and other objects, advantages and features of the invention will be more fully understood by referring to the following descriptions and claims taken in conjunction with the accompanying drawings.

BRIEF DESCRIPTION OF THE DRAWINGS

FIGS. 1A and 1B taken together as shown in FIG. 1C are a schematic illustration, partly in block diagram form, showing a system embodying features of the present invention for controlling the power applied to a load.

DESCRIPTION OF THE PREFERRED EMBODIMENT

Figure 1B:
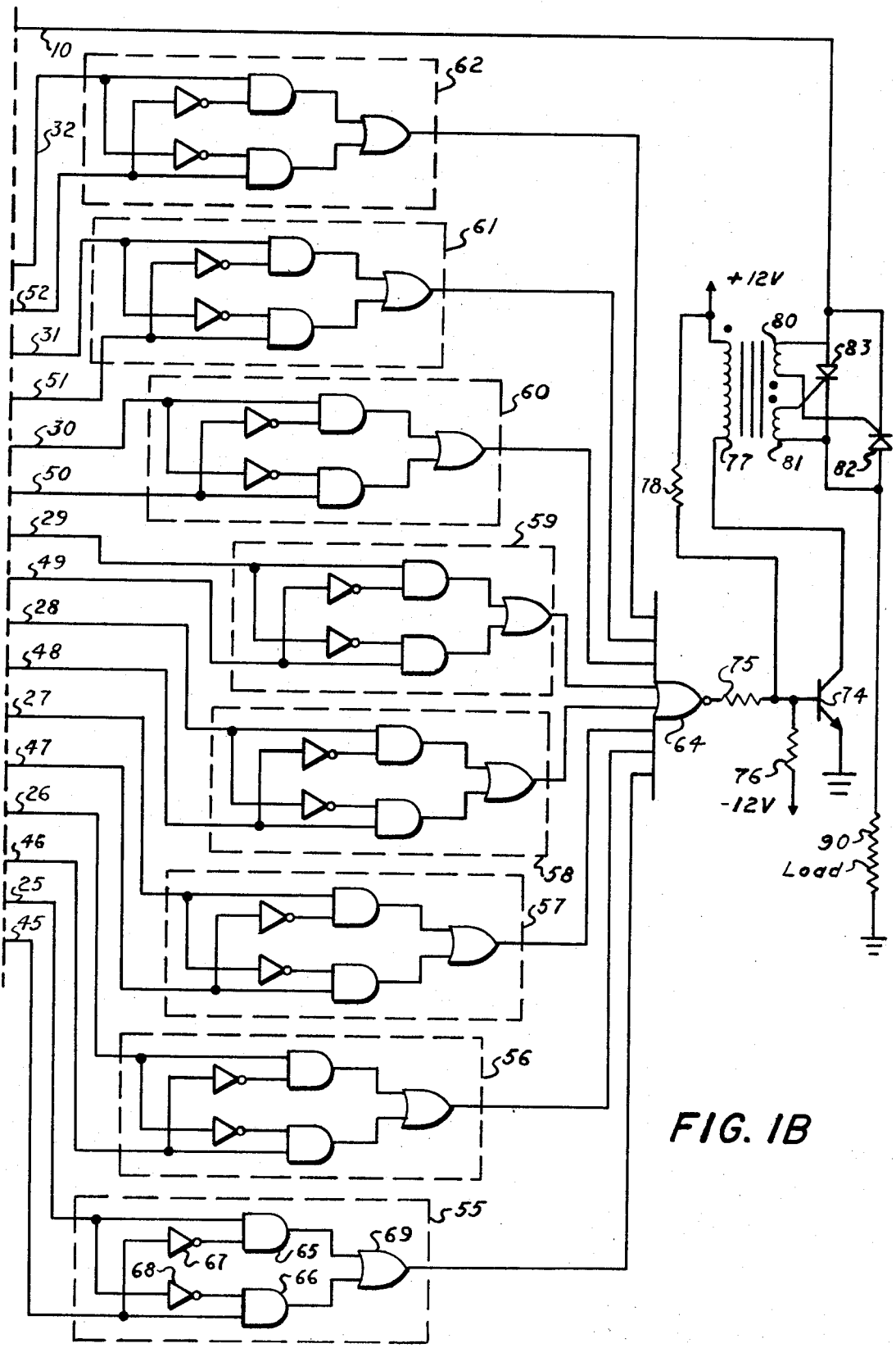

Referring now to FIGS. 1A, 1B electrical power is introduced into the system from a source, not shown, in the form of an AC voltage on a suitable conductor 10. It will be seen that the use of an AC source is advantageous since it provides a periodic voltage. A zero crossing detector 11, is provided, which is connected with the conductor 10 by way of resistors, 12 and 13, to sense the AC voltage. Resistors 12, 13 are suitably chosen to function as a voltage divider circuit whereby both the voltage and current applied to the zero crossing detector 11, are controlled to a reasonably low level. The zero crossing detector includes conventional circuit elements such as high gain differential amplifiers and logic gates to detect each successive occurrence of a zero value of the source voltage. It also includes a pulse generating output circuit to provide an output pulse of relatively short duration each time the source voltage crosses zero. The output of the zero crossing detector is carried to a conventional oscillator circuit 14 and to the present terminals of each of the bistable circuits, or flip-flops, 15–22, of a binary counter. The oscillator output is applied to the first stage of the counter at flip-flop 15 to step the counter. The number of stages used in the counter depends upon the desired resolution of power control. Thus, for example, if one part in 256 resolution is desired an eight stage counter is used.

The oscillator 14, is preferably chosen to provide a multiplicity of pulses for each half-wave of the source voltage sufficient in number to step the counter down completely through its full count. Thus, the preferred oscillator frequency is equal to twice the input AC frequency times the number of stages in the counter. In this example, if the input AC voltage is at 60 Hz the oscillator frequency is therefore 960 Hz.

Initially, when the input AC voltage crosses zero, the zero crossing detector 11 provides an output pulse which synchronizes the oscillator 14 and presets each stage of the counter to the 1, or high, state. As the input AC voltage traces its half-wave, between zero crossing points, the oscillator steps the counter so that it counts downwardly until the next zero crossing point when all stages will have counted down to zero. The next pulse from the detector 11, presents the counter and resynchronizes the oscillator so that the count-down cycle is repeated for each half-wave of the source voltage.

It will become evident that with minor modifications of the connections to the counter stages 15–22, the counter can be used in an upward counting mode, rather than the downward mode described, and still obtain an equally operative result. In that event the zero crossing detector 11 would be connected to the counter in a manner to set all its stages to zero on each occurrence of the zero crossing point pulse. Thus, the preset of the counter described above in the first example can be generically referred to as a reset.

The output signal from the counter is taken in parallel form from the set, or high, terminals of each of the flip-flops 15–22 and is carried on conductors 25–32. This parallel signal varies with time during each half-wave of the source voltage and is somewhat synonymous to the net power available in the balance of each half-wave since the counter counts down from its maximum count at the beginning of each half-wave to zero at the end.

A register is provided comprised of eight "D" type flip-flops 35–42. These flip-flops are of the type which include a pedestal input, a trigger input, and at least one output such as at the high, or set, terminal. When a pulse is received at the trigger input the set terminal will assume whatever logic state is then present at the pedestal input. The eight pedestal inputs of flip-flops 35–42 are each connected with a register input circuit 43. The respective trigger inputs are connected together and also connected with the register input circuit by a conductor 44.

A parallel digital signal representing the amount of power to be applied to the load is entered into the register input circuit from a source not shown. This signal represents the power to be applied to the load in terms of a time portion of a half-wave of the source voltage which when thus applied over successive half-wave cycles results in the required average power being received by the load as a long term average. The criteria for generating this signal are more fully set forth below in the discussion in reference to FIG. 3. The register is set once for any given power level desired by applying the digital signal to each of the bistable circuits 35–42 while concurrently applying a trigger pulse on the conductor 44. Thus, a time constant parallel digital signal representing the required power to be applied to the load is provided at the set terminals of the bistable circuits 35–42. These set terminals are respectively connected with conductors 45–52 to carry the digital signal in parallel form.

To control the switching of the source to the load a comparator logic circuit is provided which includes a set of eight identical exclusive OR circuits 55–62 having their outputs joined to the input of a NOR gate 64. Each of the exclusive OR circuits are connected to receive an input from a stage of the counter 15–22, and an input from a corresponding stage of the register 35–42. It is an object of the comparator circuit to provide a pulse at the output of the NOR gate 64 in each half-wave cycle when the count of bistable circuits 15–22 achieves a value equal to the setting in the register 35–42. At that point the input AC source is applied to the load until the end of the half-wave cycle and then reapplied when equality is again obtained in the next half-wave.

This manner of operation can be understood by examining the gates employed in any one of the logic circuits 55–62. Thus, the exclusive OR circuit 55 includes AND gates 65, 66, inverters 67, 68 and an output OR gate 69. The AND gate 65 receives a first input from conductor 25 connected with the set terminal of the first counter bistable circuit 15. The gate 65 receives its second input, in inverted form through inverter 67, which is connected with conductor 45, which is, in turn, connected with the set terminal of the first register bistable circuit 35. The AND gate 66 receives a first input directly from the conductor 45 and an inverted input from the conductor 25 through inverter 68. The output of AND gates 65, 66 serve as the input to OR gate 69.

When there is an equality of states on the conductors 25, 45, ie, when the signals in both conductors are in the same state, the output of both AND gates 65, 66 will be in the low state. Hence, the output of the OR gate 69 will also be in the low state. When there is inequality of states in the conductors 25, 45 one of the gates 65, 66 will provide a high output which passes through the OR gate 69 providing a high at its output. This high passes through the NOR gate 64 and appears in the form of a low state at its output. Thus, when there is inequality between the states of any of the pairs of inputs to the respective comparator stages 55–62, the NOR gate 64 will provide a low state at its output. When complete equality is obtained the output of the NOR gate 64 will switch to the high state. This signify that the count obtained in the counter 15–22 is equal to the preset value in the register 35–42.

To amplify the output pulse of the NOR gate 64, the output of this gate is connected with the base of an n-p-n transistor 74, through a resistor 75. The base is also connected to a source of negative potential through a suitable biasing resistor 76. The collector is connected to the primary coil 77, of a pulse transformer. The other end of the coil 77 is connected to a suitable source of positive voltage and is also connected through a resistor 78, to the base of the transistor 74, thus completing the collector circuit.

The pulse transformer includes two secondary coils 80, 81 the positive output terminals of which are respectively connected with the trigger inputs of silicon, or pulse controlled rectifiers, 82, 83. The positive terminal of the rectifier 83 is connected with the conductor 10, carrying the AC source voltage. Also, connected with the conductor 10 is the negative terminal of the rectifier 82. The negative terminal of the rectifier 83 is connnected with the load 90 to which is also connected the positive terminal of the rectifier 82. This back-to-back configuration of the rectifiers with respect to the transformer enables conduction to the load in both positive and negative portions of the source voltage.

When a pulse appears at the output of the NOR gate 64 it is amplified and passes through the primary coil 77 of the pulse transformer. All such pulses are of the same polarity and cause a transformer primary current in the same direction. This results in a pulse output of both secondary coils to be concurrently applied to the rectifiers 82, 83. However, the rectifier which is then biased in the forward direction will conduct when it receives this trigger input. Thus, during positive portions of the AC input the rectifier 83 will conduct after the occurrence of the pulse and during negative portions of the AC input the rectifier 82 conducts after the occurrence of the pulse. The load 90 is subjected to both positive and negative conduction intervals of the rectifiers.

Figure 2:
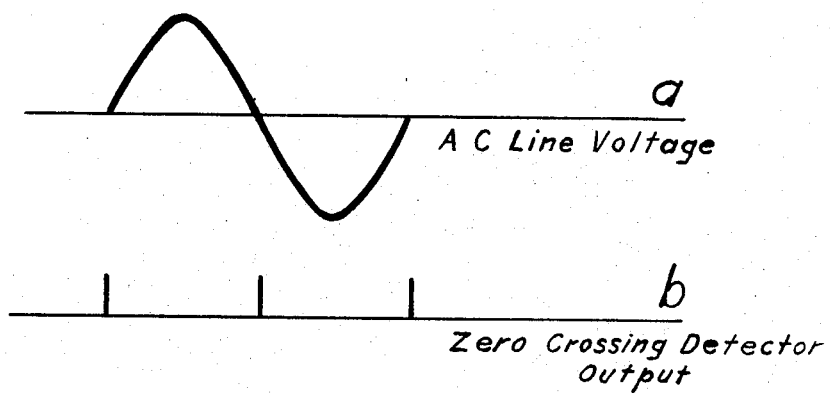
FIG. 2 illustrates a number of voltage wave forms which prevail at various points in the apparatus of FIG. 1, drawn to a common time scale. More specifically, line $a$ shows the AC input voltage, line $b$ shows the output of the zero crossing detector, line $c$ shows the output of the comparator circuit, line $d$ shows the voltage waveform applied across the load, and line $e$ shows the output of the oscillator circuit.
Figure 2:
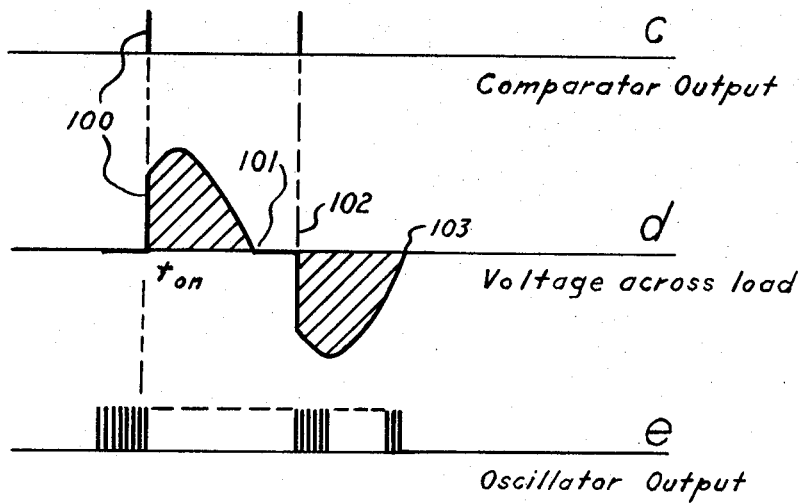

Referring now to FIG. 2 line $a$ shows the waveform of the AC source voltage, while the waveforms shown on lines $b$, $c$, $d$, and $e$ are drawn to the same time scale. On line $e$ is shown the pulsed output of the oscillator 14. Line $b$ shows the output pulse of the zero crossing detector 11, which occurs at each zero crossing point of the source voltage. Line $c$ shows the output of the comparator, ie, the output at the NOR gate 64, which occurs as a pulse of short duration substantially equal in duration to the oscillator output pulses when the count in the counter is equal to the register setting as discussed above. Line $d$ illustrates the resulting voltage appearing across the load 90.

The instant of application of the voltage to the load in each half-wave is firstly delayed for a time period until the count in the counter achieves the preset value in the register at point 100. The comparator output pulse starts conduction of the first pulse controlled rectifier which continues to conduct in the balance of the half-wave until a zero value of the AC voltage is reached at 101. At this point both rectifiers 82, 83, are nonconductive and the counter is again preset to its initial setting. The count-down cycle is repeated in the negative half-wave of the input voltage so that its point of application to the load is delayed as shown between points 101 and 102. At 102 conduction is resumed and continued until the end of the full cycle at 103.

It can be seen that any degree of power control is obtainable with the system of the present invention. The whole, or nearly all, of the AC wave could be applied to the load by switching it on very early in the cycle, ie, by using a very high setting in the register. Conversely, a very small portion of the power can be applied by delaying the instant of switching the rectifiers into conduction nearly to the end of the half-wave.

Figure 3:
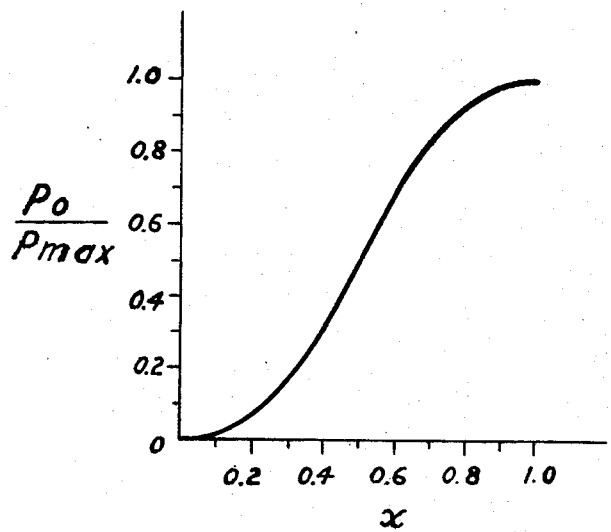
FIG. 3 is a graphical representation showing a ratio of the average power received by the load to the total power available plotted against the fractional portion of the AC source's half-wave over which the source voltage is applied to the load.

Referring now to FIG. 3 which is a reasonably accurate graphical representation of the average power applied to the load in the form of a ratio to the maximum power if the whole input AC waveform is applied, plotted against a decimal quantity "$x$". It will be seen that this quantity is the decimal counterpart of the binary digital value set into the register. This graphical representation can be best understood by examining a few mathamatical relationships. The input voltage, $V_i$, can be thus expressed as a function of time, $t$:

$$Vi = C \sin t \qquad (1)$$

where: $C$ is an arbitrary constant.
Examining the waveform on line $d$ of FIG. 2, the net power, $P_o$, applied to the load having an effective resistance, $R$, can be expressed as the following integral between the limits of $t_o$, the moment of time the power is applied to the load, and $\pi$, the end of the half-wave, thusly:

$$P_o = 2 \int_{t_{on}}^{\pi} (V_i)^2 / R \, dt \qquad (2)$$

Substituting equation 1 and evaluating equation 2 above we have:

$$P_o = 2C^2/R(\pi - t_{on} + \sin t_{on} \cos t_{on}) \qquad 3$$

Expressing equation 3 as a fraction with respect to the maximum power available when $t_{on}$ equals zero we have:

$$P_{max} = 2C^2/R(\pi) \qquad 4$$

and:

$$P_o/P_{max} = 1 - t_{on}/\pi + \sin t_{on} \cos t_{on}/\pi \qquad (5)$$

We now should like to define a convenient number "$x$" which is always smaller than unity and greater than zero thus:

$$t_{on} = \pi(1-x), \text{ and } x = \pi - t_{on}/\pi! \qquad 6$$

Substituting equations (6) in equation 5 we have:

$$P_o/P_{max} = x + \sin[\pi(1-x)] \cos[\pi(1-x)]/\pi \qquad 7$$

Equation 7 defines the curve illustrated in FIG. 3. The quantity "$x$" is linear with time and has a value of unity when the maximum power is applied i.e.; when the full AC wave is applied to the load. Thus, at that point, the ratio of $P_o$ to $P_{max}$ is also unity. It should be noted that the value "x" represents the time portion from $t_{on}$ to the end of the half-wave over which the input voltage is applied to the load to obtain the desired $P_o/P_{max}$. Thus, the setting required in the register of FIG. 1 is the binary digital counterpart of the quantity "x". It can be seen that the larger is the setting established in the register the greater is the power applied to the load and vice versa. As a consequence, the counter 15–22 is used in the down-counting mode.

At this point it should be quite clear that should an up-counting mode of the counter be desired it can be readily obtained by using the compliment of "x" i.e., 1−x, as the register setting and by employing the zero crossing pulse from the detector 11 to reset all the counter stages to zero, or the low state, at the commencement of each half-wave cycle. However, the down-counting mode is preferred since, as indicated, it lends a closer relationship between the register input signal and the actual power delivered to the load.

It can be appreciated by those skilled in the art that the AC source voltage need not have a sinosoidal waveform. Indeed, it need not be an alternating voltage. It is merely preferred that it have a repeated periodic characteristic since only the periodic nature of the source voltage is relied upon to signal the starting point of each cycle of power control in accordance with the present invention.

While the invention has been described with a certain degree of particularity, it can, nevertheless, be seen by the examples hereinabove set forth, that many modifications and variations of the invention can be made without departing from the true spirit and scope thereof.

I claim:

1. Apparatus for applying a predetermined average amount of power to a load from a source providing an AC voltage, comprising;
   a. means for generating a first digital signal representative of the power available from said AC voltage as a function of time over the half-wave time interval of said voltage;
   b. means for entering into said apparatus a second digital signal representative of said predetermined average amount of power;
   c. a comparator for comparing said first and second digital signals;
   d. said comparator comprising:
      i. a plurality of identical exclusive OR circuits;
      ii. the outputs of said OR circuits being joined to the input of a NOR gate;
      iii. each of the exclusive OR circuits being connected to receive an input from a stage of a counter;
      iv. and an input from a corresponding stage of a register; and
   e. switching means responsive to said comparator for switching said voltage on and off said load during each successive half-wave cycle of said voltage to provide for said predetermined average power applied to said load.

2. Apparatus for applying a predetermined average amount of power to a load from a source providing an AC voltage, comprising:
   a. means for generating a time varying first digital signal corresponding to the progression of time during the half-wave time interval of said AC voltage from a zero crossing point thereof;
   b. means for entering into said apparatus a second digital signal corresponding to a portion of time from a zero crossing point of said AC voltage which if said AC voltage is applied to said load over said portion of time results in said average power applied to said load as an average over the half-wave time interval of said AC voltage;
   c. a comparator for comparing said first and second digital signals, said comparator comprising:
      i. a plurality of identical exclusive OR circuits;
      ii. the output of said OR circuits being joined to the inputs of a NOR gate;
      iii. each of the exclusive OR circuits being connected to receive an input from a stage of a counter;
      iv. and an input from a corresponding stage of a register; and
   d. switching means responsive to said comparator means for switching said voltage on and off said load during the half-wave cycle of said voltage to provide for said voltage applied to said load over said portion of time.

3. The apparatus of claim 2 wherein said digital signal generating means (a) comprises:
   a zero crossing detector coupled with said AC voltage source including a pulse forming output circuit for detecting the successive zero voltage crossing points of said AC voltage and for providing a pulse signal on each zero crossing occurrence of said AC voltage;
   an oscillator tuned to generate a pulse train signal at a frequency providing a multiplicity of pulses over each half-wave cycle of said AC voltage; and
   a binary digital counter coupled with said oscillator and with said zero crossing detector to provide a count of the successive pulses of said pulse train signal following the occurrence of each of said zero crossing points and for providing said first digital signal corresponding to said count, said counter including reset means responsive to said zero crossing detector pulse signal for resetting said counter to a given starting count on the occurrence of each said zero crossing points.

4. The apparatus of claim 3 wherein said switching means (d) includes a pair of pulse controlled rectifier diodes back-to-back coupled and connected with said AC voltage source and with said load to provide conduction to said load in both positive and negative portions of said AC voltage;
   and wherein said comparator means (c) includes output gating means coupled with said diodes for providing a trigger pulse to said diodes in each half-wave cycle of said AC voltage causing conduction to said load over said portion of time, said diodes becoming non-conductive at the zero crossing point of said AC voltage subsequent to said portion of time of conduction, whereby said portion of time of conduction to said load includes the latter part of each of said successive half-wave cycles of said AC voltage being commenced by said trigger pulse and being terminated by the next zero crossing point of said AC voltage.

* * * * *